United States Patent [19]

Adelbratt

[11] 4,411,551
[45] Oct. 25, 1983

[54] DEVICE FOR PROVIDING A FRICTION JOINT

[75] Inventor: Kurt Adelbratt, Gothenburg, Sweden

[73] Assignee: Aktiebolaget SKF, Sweden

[21] Appl. No.: 242,830

[22] Filed: Mar. 12, 1981

[30] Foreign Application Priority Data

Mar. 19, 1980 [SE] Sweden ................. 8002136

[51] Int. Cl.³ ............................... F16D 1/06
[52] U.S. Cl. ........................ 403/370; 403/374
[58] Field of Search ............... 403/371, 370, 16, 372, 403/15, 273, 345, 334, 368, 374

[56] References Cited

U.S. PATENT DOCUMENTS

| 2,062,290 | 12/1936 | Bott ........................... 403/368 X |
| 2,509,711 | 5/1950 | Williams ........................... 403/16 |
| 3,501,183 | 3/1970 | Stratienko ........................... 403/370 |
| 3,682,505 | 8/1972 | Firth ........................... 403/370 |

FOREIGN PATENT DOCUMENTS

| 1255369 | 1/1961 | France ........................... 403/374 |
| 775053 | 5/1957 | United Kingdom ........................... 403/371 |
| 1036492 | 7/1966 | United Kingdom ........................... 403/365 |

Primary Examiner—Andrew V. Kundrat
Attorney, Agent, or Firm—Eugene E. Renz, Jr.

[57] ABSTRACT

The invention concerns a device for providing a friction joint. It comprises an inner (1,11) and an outer (2,9) element, the inner element having a tapered outer surface co-operating with a complementary tapered inner surface in a bore in the outer element. Means (6,7,8,12) are provided for displacing the elements axially parallel to the taper axes. One element preferably consists of a slitted clamping sleeve, and for diminishing the friction in the tapered contact and simplifying manufacturing of the parts of the device, one of the tapered surfaces is provided with a friction reducing material and one of the tapered surfaces has a groove (3,4,5,13,14,15,16) extending around the circumference.

7 Claims, 4 Drawing Figures

DEVICE FOR PROVIDING A FRICTION JOINT

BACKGROUND AND SUMMARY OF THE INVENTION

The present invention relates to a coupling device for providing a friction joint between members.

Such devices are previously known, and generally at least one of the inner and the outer element consists of an axially slitted sleeve with a cylindrical surface, which contacts a corresponding surface on an adjacent member. The sleeve is deformed radially during the mounting procedure and provides a friction joint over the cylindrical surfaces. Such a friction joint can thus easily be established and released by axially displacing the elements provided with the tapered surfaces.

In order to obtain a sufficient surface pressure to establish a suitable force and torque transmitting ability in the friction joint, the axial force applied during the displacement has to be comparatively great and the cone angle in the tapered surfaces has to be rather small. It is an advantage if the coefficient of friction between the tapered contact surfaces is small, since thereby the axial force necessary to obtain a desired surface pressure will be moderate and it is known to provide the co-operating tapered surfaces with a low friction surface layer.

A desired result when applying e.g. polytetrafluoroethylene has only been achieved when both the tapered surfaces have been covered. This implies that complete devices are comparatively expensive.

The object of the present invention is to obtain a device of the kind stated in the introduction, which device can be produced simply and inexpensively, and with which a safe friction joint can be established by using a comparatively small axial force.

To this end, in accordance with the present invention, the coupling device comprises inner and outer elements each having confronting complementary tapered surfaces, which elements are actuatable axially relative to one another in a direction parallel to the cone axes of the tapered surfaces to effect radial deformation of at least one of the elements. The tapered surface of one of the elements is continuous and the complementary tapered surface of the other element has at least one circumferential groove formed therein, thereby providing only contact between the surfaces at other than the groove location and thus reducing the active contact surface area between the tapered surfaces. The tapered surface of the one element is provided with a deformable friction reducing material which transfers to the initially uncovered tapered surface of the other element during axial displacement of the elements.

The separate elements constituting the device can be manufactured by e.g. automatic turning, and only one tapered surface has to be covered by a friction reducing material during the manufacturing process.

DESCRIPTION OF THE DRAWINGS

In the following the invention will be further described with reference to the accompanying drawings, in which the FIGS. 1 and 2 show a longitudinal section and an end view of a device according to an embodiment of the invention, and.

DESCRIPTION OF THE PREFERRED EMBODIMENTS

Figure 1:
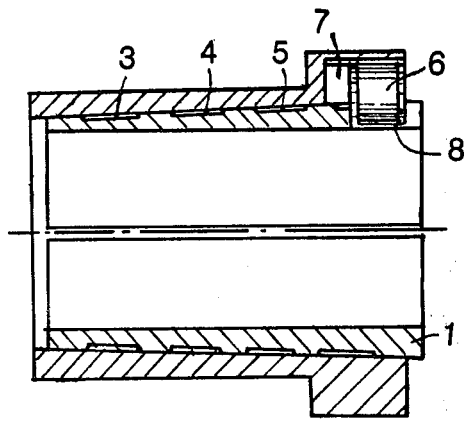
Figure 2:
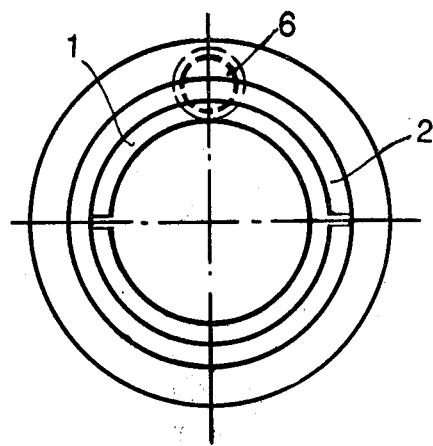

The device according to FIGS. 1 and 2 comprises an inner element 1 in the shape of an axially slitted sleeve with a cylindrical bore and a tapered outer surface, and an outer element 2 in the shape of an axially slitted sleeve with a cylindrical outer surface and a bore with a tapered inner surface. The device is intended for being introduced into a cylindrical bore in a surrounding element, which is to be mounted on e.g. a cylindrical shaft in the bore of the element 1. The tapered surfaces are complementary, and when the inner sleeve 1 is forced into the bore of the outer sleeve 2, the outer sleeve expands and the inner sleeve is contracted so that the cylindrical surfaces are pressed radially against adjacent cylindrical surfaces in the surrounding element and on the shaft, respectively. Thereby a friction joint is established. One of the co-operating tapered surfaces is provided with a friction reducing material. Polytetrafluoroethylene is a suitable friction reducing material.

Further, one of the co-operating tapered surfaces is provided with one or more recesses 3,4,5 extending around the circumference. Thereby contact is established only over the non-recessed portions of the surface, whereby the total contact surface is diminished and the surface pressure is increased. The recesses may consist of a number of co-axial annular grooves. As an alternative, the recess may consist of a helical groove. For manufacturing reasons it is preferable that the outer tapered surface of the inner element is provided with recess as well as friction reducing material during manufacturing. However, other embodiments are possible. The depth of the recess may be about 0.2–0.4 mm, and the total recess area is so large that the rest of the tapered surface gives a desired contact pressure at given parameters, such as cone angle, possible axial force and desired force transmitting ability in the friction joint. Because of the increased surface pressure a portion of the friction reducing material is rubbed off and adheres to the initially non-covered tapered surface, whereby the coefficient of friction in the contact is reduced.

The relative axial displacement of the elements can be brought about by a screw 6 co-operating with a groove 7 with an approximately semi-circular profile in the outer element and a groove 8 with a complementary semi-circular profile in the inner element. The extension of the groove is parallel to the axes of the sleeves, and one groove 7 has a thread which co-operates with the thread of the screw, whereas the outer groove 8 is smooth and limited by contact surfaces for the ends of the screw. When the screw is turned, which e.g. can be done by a suitable key, it rotates in the groove 8 and is prevented by the contact surfaces to be displaced axially, while the threads in the screw and in the groove 7 make the sleeves 1 and 2 move axially in relation to each other in one direction or the other depending on the turning direction of the screw. The screw also prevents the sleeves 1 and 2 from being turned and displaced after mounting.

Because of the friction properties in the tapered surfaces, a single screw 6 is sometimes sufficient for obtaining the necessary axial force, but it is of course possible to provide more screws around the periphery or to employ other means for achieving the axial displacement.

Figure 3:
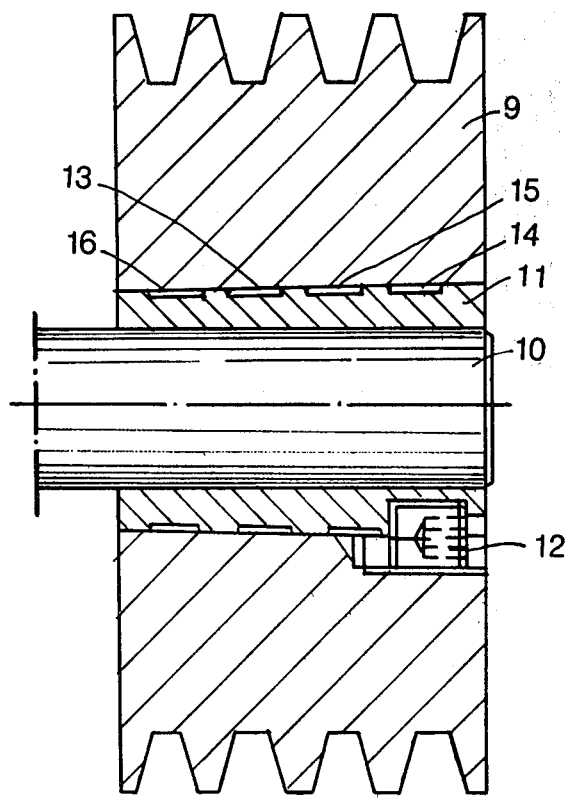
FIGS. 3 and 4 show longitudinal sections of devices according to other embodiments of the invention.

In FIG. 3 an arrangement is shown in which the invention is used for mounting a belt pulley 9 on a shaft 10. The pulley has a tapered bore in which is mounted a slitted sleeve 11 with a complementary tapered outer surface. The sleeve 11 surrounds the shaft 10 and is pressed against it when being pushed axially in relation to the pulley 9 by turning of the screw 12 in a manner described above. The outer surface of the sleeve is provided with a member of recesses 13, 14, 15, 16 and the non-recessed portions are provided with a friction reducing material of the kind mentioned above.

Figure 4:
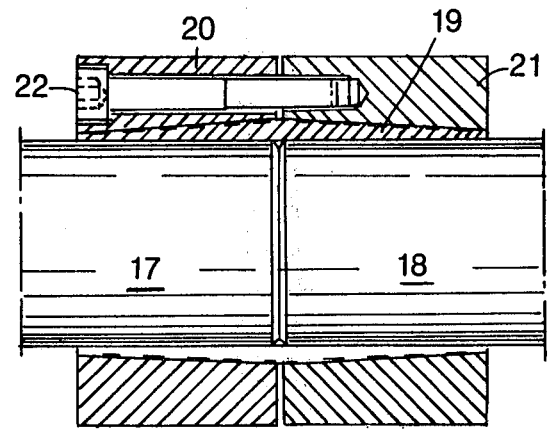

FIG. 4 shows a device for connecting two shafts 17, 18. It comprises a double conical inner sleeve 19 and two outer sleeves 20,21 which can be pressed against the inner sleeve by turning a number of screws 22, whereby the inner sleeve is clamped against the shafts 17,18 respectively.

What is claimed is:

1. A coupling device for providing a friction joint comprising inner and outer elements, said inner element having a tapered outer surface for engagement with a complementary tapered inner surface formed in a bore in the outer element, means for axially displacing said elements in relation to each other parallel to the cone axes of the tapered surfaces for radially deforming at least one element, the tapered surface of one of said elements being continuous and the complementary tapered surface of the other element having at least one circumferential groove formed therein thereby providing only contact between the tapered surfaces at other than the groove location and thereby reducing the active contact surface area between said tapered surfaces, the tapered surface of one of said elements only being provided with a deformable friction reducing material which transfers to the initially uncovered tapered surface of the other element during axial displacement of said elements.

2. Device according to claim 1, characterized by that the inner element is a radially deformable sleeve intended for surrounding and being clamped against a shaft or the like.

3. Device according to claim 1, characterized by that one of the tapered surfaces has a number of co-axial annular recesses.

4. Device according to claim 1, characterized by that one of the co-operating tapered surfaces has a helical recess.

5. Device according to claim 1, characterized that the friction reducing material is provided on the tapered surface having at least one recess and on the portions which contact the other tapered surface.

6. Device according to claim 1, characterized by that the friction reducing material is polytetrafluoroethylene.

7. Device according to claim 1, characterized by that it is provided with a single screw (6.12) for axially displacing the elements in relation to each other parallel to the cone axes of the tapered surfaces.

* * * * *